Nov. 23, 1937.  H. E. HARTIG  2,099,687
TEMPERATURE CONTROL APPARATUS
Filed Nov. 4, 1936  2 Sheets-Sheet 1
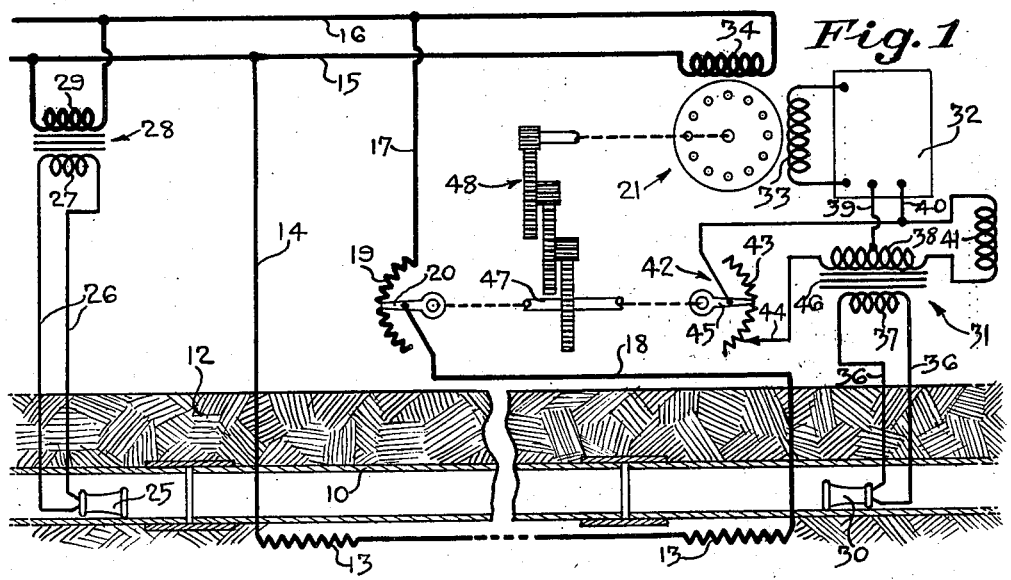
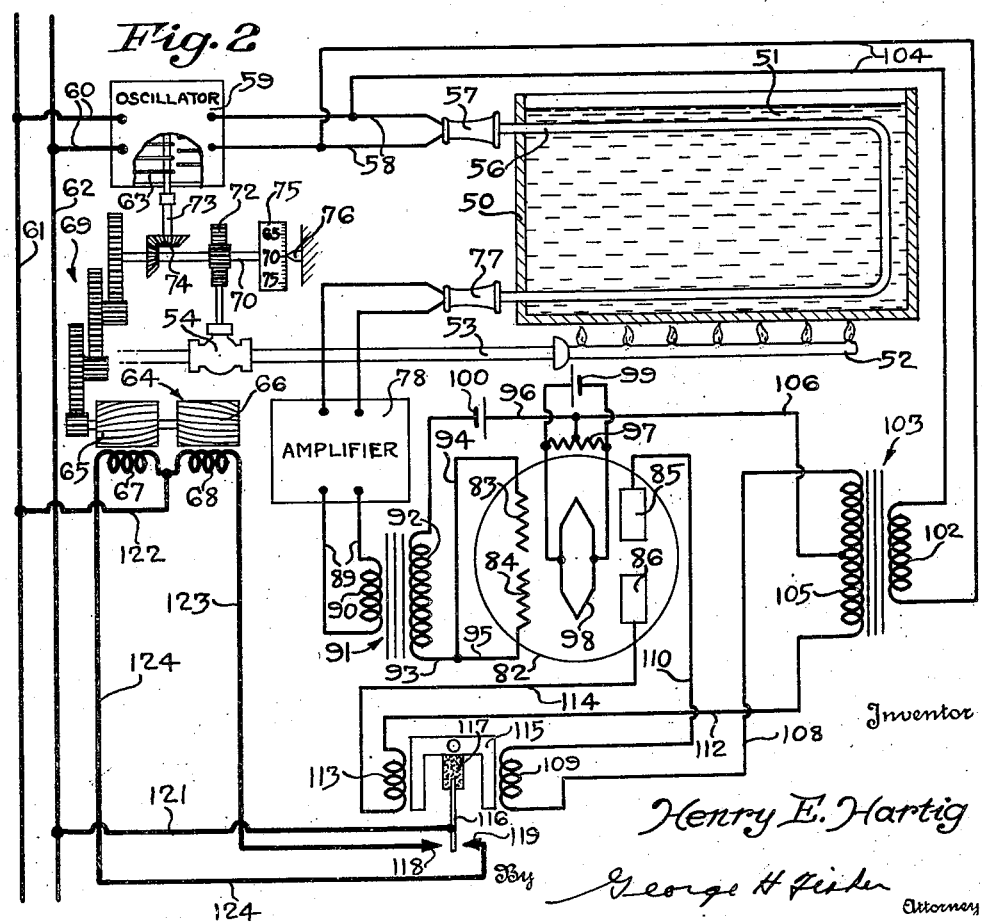
Inventor
Henry E. Hartig
By George H. Fisher
Attorney

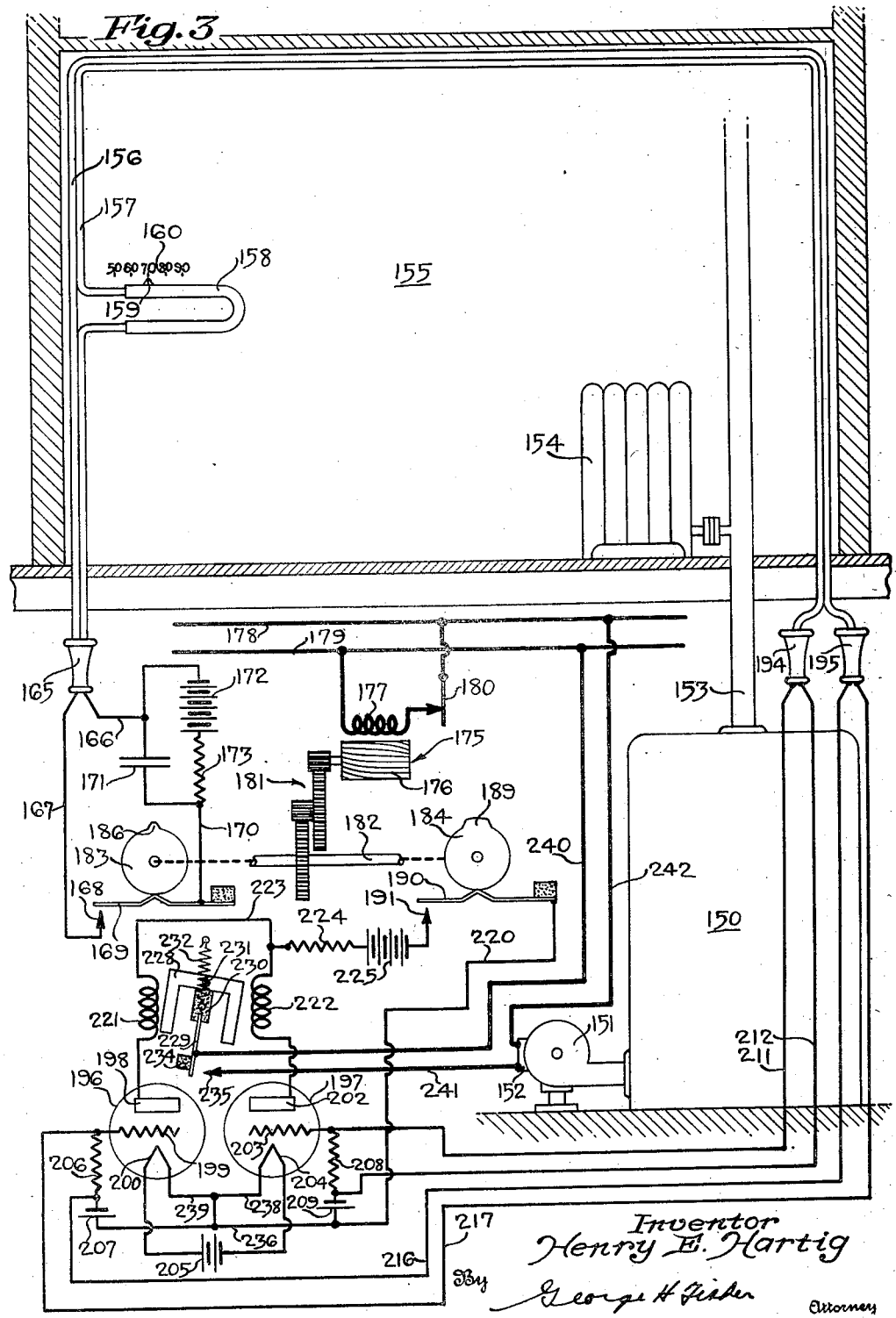

Patented Nov. 23, 1937

2,099,687

UNITED STATES PATENT OFFICE 2,099,687

TEMPERATURE CONTROL APPARATUS

Henry E. Hartig, Robbinsdale, Minn., assignor to Minneapolis-Honeywell Regulator Company, Minneapolis, Minn., a corporation of Delaware Application November 4, 1936, Serial No. 109,121

17 Claims. (Cl. 236—1)

My invention relates to temperature responsive apparatus and more particularly to such apparatus based upon the effect of temperature upon the speed of transmission of sound.

An object of the present invention is to provide a temperature responsive apparatus which is actuated in accordance with the time required for a sound impulse to travel over a path extending through a medium whose temperature is to be considered.

A further object of the present invention is to provide temperature controlling apparatus wherein energy is transmitted over two paths, the speed of transmission of the energy over said paths being differently influenced by the temperature to be controlled, and wherein a temperature varying means is positioned in accordance with the difference in speed of transmission of said energy over said two paths.

A further object is to provide temperature controlling apparatus wherein a temperature varying means is controlled by a normally balanced system, the balance being upset by a variation in the time required for an alternating sound impulse to travel over a path of predetermined length through a medium whose temperature is to be controlled and is restored by an adjustment of said temperature varying means by a corresponding adjustment of the frequency of said sound impulse.

A further object of the present invention is to control the temperature of fluid in an underground pipe line by varying the heat supplied thereto in accordance with the time required for a sound impulse to travel a predetermined distance through said fluid.

Other objects of the invention will be apparent from a consideration of the accompanying specification, claims and drawings of which:

Figure 1 is a schematic view of one form of my invention as applied to the control of fluid in an underground pipe line;

Figure 2 is a schematic view of a second form of my invention shown for purposes of illustration as applied to the control of the temperature in an industrial bath, and Figure 3 is a third form of my invention shown for purposes of illustration as applied to the control of the temperature of a room.

As previously stated, the present invention is concerned with a temperature responsive apparatus which is operated in accordance with the speed of transmission of sound through a medium whose temperature is under consideration. In general, the apparatus comprises means for introducing a sound impulse at one point of a path extending through a medium whose temperature is under consideration and measuring the time that it takes for the sound to travel over such a path. This may be done in various ways. One method is to employ an alternating current which is transformed into periodical sound impulses which are sent over the path through the medium whose temperature is in question and thereafter reconverted to alternating current and to compare the phase of this reconverted alternating current with the phase of the original current source. If a path through the medium whose temperature is under consideration can be selected so as to be sufficiently long, as for example, in a pipe line, it is possible to employ relatively low frequencies which are suitable for direct actuation of motors or the like. Such a form is shown in Figure 1 of the drawings.

Referring to Figure 1, an underground pipe line is designated by the reference numeral 10, this pipe line being shown as located beneath the surface of the ground 12. Associated with the pipe line are electrical heating elements 13. One terminal of these elements is connected through a conductor 14 to one of two line wires 15 and 16 leading to a suitable source of power (not shown). The other terminal of the heating elements 13 is connected to the other line wire through conductors 17 and 18 and a rheostat comprising resistance 19 and contact arm 20. It will be readily seen that the rheostat is so located that movement of arm 20 controls the amount of electrical energy supplied to heating elements 13 and, accordingly, controls the heating effect thereof. A motor 21 is employed to control the position of contact arm 20 as will be more fully explained later. This motor is controlled in accordance with the time required for a sound impulse to travel a predetermined distance through the pipe line 10. The means for so controlling the motor will now be described.

Located at some suitable point in the pipe line 10 is a telephone receiver 25 or other suitable device for converting electrical energy into sound energy. This receiver 25 is connected through conductors 26 to the secondary 27 of a transformer 28. The transformer 28 comprises in addition to the secondary 27 a primary 29 which is connected to the line wires 15 and 16. It will be readily seen that the effect of the alternating current flowing through the telephone receiver 25 will be to cause a pulsating sound to travel through the pipe line 10. At a point considerably spaced from the receiver 25 is a second electromagnetic telephone receiver 30 which, in this case, functions to generate an electrical current in accordance with the intensity of the sound received thereby. The current generated by this receiver 30 is connected through a phase shifting device 31 with the input terminals of amplifier 32. The output of amplifier 32 is connected to winding 33 of motor 21 which is provided with two windings 33 and 34, so disposed that the motor is operated as a two-phase motor. The other winding 34 is connected with the line wires 15 and 16 so that the same is energized by current of substantially the same phase as that with which transformer 28 is energized. The apparatus is so adjusted that when the temperature in the pipe line 10 is at substantially a desired temperature and rheostat arm 20 is in substantially its mid position, the phase of the current in windings 33 and 34 is the same so that the motor armature 21 will not be rotated. When the apparatus is so adjusted, it will be readily seen that any change in the temperature within pipe line 10 will cause the phase of the current energizing winding 33 to be shifted with respect to that energizing winding 34 so as to cause rotation of the motor 21. Due to the fact, moreover, that a decrease in the average temperature within the pipe line 10 would shift the phase in an opposite direction from that caused by an increase in the average temperature of the pipe line, the motor will be rotated in one direction or the other depending upon the direction in which the temperature changes.

Referring more particularly to the method for controlling the phase of the current in winding 33 from the telephone receiver 30, it will be noted that the receiver 30 is connected through conductors 36 to the primary 37 of a transformer 46. The transformer 46 comprises a secondary 38. The mid point of this secondary 38 is connected through a conductor 39 to an input terminal of the amplifier 32. This amplifier may be of any suitable form, a thermionic amplifier of any conventional type being particularly suitable for this use. The other input terminal of the amplifier 32 is connected through conductor 40 to the common connection of an inductance 41 and the resistance of a rheostat 42, which inductance and rheostat are connected to opposite terminals of the secondary 38. The rheostat 42 comprises a resistance 43 with which cooperate a manually adjustable contact 44 and a contact arm 45 which is operated by the motor in a manner to be presently explained. The manually adjustable contact 44 is for the purpose of initially adjusting the apparatus. The apparatus consisting of transformer 46, inductance 41 and rheostat 42 is merely one of a number of conventional forms of phase shifting arrangements which may be employed.

The motor 21 is connected to a shaft 47 through a reduction gear train 48. The shaft 47 has secured thereto the contact arms 20 and 45 so that rotation thereof by the motor 21 affects both the amount of energy supplied to the heating elements 30 and the phase shifting effect of the phase shifting apparatus 31. The phase shifting apparatus 31 is adjusted, as previously indicated, so that when the average temperature in the pipe line 10 is at the desired value and when the shaft 47 is in such a position that contact arm 20 is substantially in the mid point of resistance 19, the energizing currents of field windings 33 and 34 will be in phase. Under these conditions, the heating elements 13 are receiving an average amount of current which, under normal conditions will maintain the temperatures of the fluid in pipe line 10 at a substantially constant temperature. If the temperature in the pipe line 10 should, however, fall, the time required for the transmission of sound impulses between the telephone receivers 25 and 30 will be increased so that the phase of the current supplied to winding 33 will lag behind that supplied to winding 34. This will cause the motor 21 to be rotated in such a direction that the shaft 47 is so rotated as to cause contact arm 20 to move upwardly and contact arm 45 to move downwardly. The result of this movement of contact arm 20 upwardly serves to reduce the amount of resistance 19 in the circuit of heating elements 13 and, accordingly, to increase the amount of heat supplied by elements 13 to the pipe line 10. The movement of contact arm 45 downwardly serves to reduce the resistance in the resistance portion of the phase shifting circuit. The result is that a larger proportion of the current supplied by transformer 46 to the input of the amplifier 32 flows through the resistance portion of the circuit so that the phase of the current is advanced. The rotation of shaft 47 by motor 21 will continue until contact arm 45 has moved sufficiently far on resistance 43 to bring the current supplied to winding 33 again in phase with that supplied to winding 34 so as to stop rotation of the motor. The result of the decrease in the temperature of the fluid in the pipe line 10 is, accordingly, to cause the motor 21 to operate to effect an increase in the heating effect of heating elements 13 and to simultaneously correct for the phase displacement caused by the decrease in temperature.

If in the new position of contact arm 20, the heating effect of elements 13 is sufficient to increase the temperature of the fluid in pipe line 10, the speed of transmission of the sound between receivers 25 and 30 will be increased. This will cause a corresponding variation in the phase of the current supplied to winding 33 with respect to that supplied to winding 34 so as to again cause rotation of motor 21. In this case, the rotation will be opposite to that caused previously. Shaft 47 will accordingly be rotated so as to move contact arm 20 downwardly and contact arm 45 upwardly. The downward movement of contact arm 20 will increase the portion of resistance 19 in the circuit of heating elements 13 and will accordingly decrease the heating effect of these elements. The upward movement of contact arm 45 will serve to increase the amount of resistance in the resistance branch of the phase shifting circuit so as to decrease the portion of the current through this branch and retard the phase of the current flowing into the amplifier. This action will continue until the change in phase caused by movement of contact arm 45 will compensate for the change in phase caused by the increase in temperature. The result will be that the temperature of the fluid in pipe line 10 will be very accurately controlled.

It will be noted that the speed of transmission of sound between receivers 25 and 30 is dependent upon the temperature at every point in the pipe line between these two receivers. In other words, instead of merely controlling according to the temperature at one or two isolated spots, the heating elements 13 are controlled in accordance with the average temperature existing throughout the whole length of the pipe line, or at least through the portion of the pipe line between receivers 25 and 30. It will further be seen that the apparatus involves the use of relatively few wires in spite of the fact that the temperature is measured over an extremely long distance. The ordinary line wires 15 and 16 are the only two conductors which it is necessary to have extending between the point at which the sound is first introduced and the point at which the controlling apparatus is located. It is imperative, of course, that no other apparatus be connected to line wires 15 and 16 between the point at which transformer 28 is connected and that at which field winding 34 is connected. If such exterior apparatus should be connected to a line between these points, the starting and stopping thereof might well cause a phase shift in the energization of winding 34 with respect to that of transformer 28. This, however, is of no particular difficulty as it is very customary to extend such line wires for considerable distances without any connections thereto.

The previously described form is of particular advantage where it is possible to have a relatively long path for the transmission of sound. Unless the path available is at least 500 feet long, it is imperative that the frequency of the current producing the sound be higher than the ordinary commercial frequency. If it is necessary to employ a relatively short pipe line, it becomes necessary to employ relatively high frequencies in order that a small temperature change will produce a sufficiently large phase shift. In other words, at a 60 cycle frequency, the wave length of sound in air at normal room temperature is approximately 18.8 feet. In order to obtain a phase change of 90°, it would be necessary for there to be one-fourth of 18.8 or 4.7 feet change in wave length. In the range around 68° F., the change in the wave length of sound approximates 0.101 per cent per degree Fahrenheit. Accordingly, in order to produce a 90° shift in phase, it would require a path having a distance of 4.7/.00101, or approximately 4700 feet, to produce the desired change in phase. Since, however, it is unnecessary to obtain a full 90° phase difference to produce rotation of the motor, a considerably lesser figure would be permissible. However, using the arrangement of the previously described species, it is imperative that at least 500 feet of pipe be employed. In the species shown in Figure 2, however, a relatively high frequency is employed so that it is possible to employ a pipe of an extremely short length.

Referring to Figure 2, the control system is shown applied to the control of the temperature of an industrial bath. It is to be understood, however, that it is obviously of broad general applicability and this application thereof is shown merely for purposes of illustration. In this figure, the reference numeral 50 designates a tank in which is contained a bath of some chemical 51. The contents of the tank 50 is heated by a gas burner 52 which is supplied with gas through a supply pipe 53. The flow of gas through pipe 53 is controlled by valve 54.

Extending through the fluid 51 in tank 50 is tube 56, which tube may be of relatively thin material of good heat conductivity characteristics, such as copper. Located adjacent to one end of the tube 56 is a telephone receiver 57. This receiver is connected through conductors 58 with the output terminals of an oscillator 59, which oscillator may be of any suitable conventional structure. The input terminals of the oscillator 59 are connected through conductors 60 to line wires 61 and 62 leading to a suitable source of power (not shown). The oscillator 59 is provided with a variable condenser 63 for adjusting the frequency of the current supplied thereby. At the other end of tube 56 is a second receiver 77 which is connected through an amplifier 78 to a thermionic relay of suitable construction which controls a motor 64 in accordance with the phase difference between the current at the output of the oscillator and the current supplied by amplifier 78 through the action of receiver 77.

The motor 64 is of any suitable reversible type and is shown in the present instance as consisting of two rotors 65 and 66 having two field windings 67 and 68 which are respectively associated with said rotors. Motor 64 operates through a reduction gear train 69 to drive a shaft 70. This shaft 70 is connected through a rack and pinion arrangement 72 to the valve stem of valve 54 so that rotation of shaft 70 causes the position of valve 54 to be changed. A shaft 73 which is connected to the shaft of variable condenser 63 is connected through a pair of bevel gears 74 with shaft 70 so that rotation of shaft 70 causes a corresponding rotation of shaft 73 and a corresponding adjustment of the variable condenser 63. It will thus be seen that rotation of shaft 70 will cause a shifting in the position of valve 54 and also an adjustment of the variable condenser 63 of oscillator 59 and, accordingly, an adjustment of the frequency of the current supplied by oscillator 59. If it is desired to have some indication of the temperature of the bath as well as a controlling action thereof, a drum 75 having suitable indicia thereon can be secured to the end of shaft 70 and a stationary pointer 76 located adjacent to said drum to cooperate therewith. Inasmuch as the position of shaft 70 is determined by the average temperature of bath 51, as will be more apparent from the subsequent description, the position of drum 75 will indicate the temperature of the bath.

The thermionic relay employed consists in part of a twin triode vacuum tube 82. This tube comprises a pair of grids 83 and 84 and a pair of plates 85 and 86. A filament cathode 98 is designed to cooperate with both grids and both plates.

The output of amplifier 78 is connected through conductors 89 with the primary 90 of a transformer 91. Transformer 91 is provided with a secondary 92, one terminal of which is connected through conductors 93, 94 and 95 with the two grids 83 and 84. The other terminal of secondary 92 is connected through conductor 96 to the mid point of resistance 97 connected across the opposite terminals of cathode 98. Also connected across the opposite terminals of cathode 98 is a battery 99 which functions to supply filament current to cathode 98. Interposed in the conductor 96 is a battery 100. It will be seen that one terminal of secondary 92 is connected to the grids and the other terminal is effectively connected to cathode 98 with battery 100 interposed in the connection and functioning to bias the grids negatively. It will further be noted that the grids are subjected to an alternating voltage resulting from the output of amplifier 78, which voltage is dependent in phase upon the time that is required for the transmission of sound between receivers 57 and 77.

The primary 102 of a transformer 103 is connected through conductors 104 to the output terminals of oscillator 59. The transformer 103 is provided with a secondary 105. The mid point of secondary 105 is connected through a conductor 106 to the mid point of resistance 97 and, accordingly, is effectively connected to the cathode 98. One end of secondary 105 is connected through conductor 108, relay winding 109 of a balanced relay to be presently described, and conductor 110 to plate 85. The other terminal of secondary 105 is connected through conductor 112, the other relay winding of the previously referred to relay and conductor 114 to plate 86. It will be readily seen that the relay windings 109 and 113 are interposed in the respective plate circuits of the two triodes constituting the tube. In other words, the current flowing through relay winding 109 is determined by the amount of plate current flowing between plate 85 and cathode 98, while similarly, the amount of current flowing through the relay winding 113 is determined by the amount of plate current flowing between plate 86 and cathode 98.

Cooperating with relay windings 109 and 113 is a pivotally mounted U-shaped armature 115. A contact arm 116 is secured to armature 115 through an insulated connection 117. Contact arm 116 is adapted to cooperate with contacts 118 and 119.

It will be readily seen that both grids have impressed upon them a voltage which has a phase relation determined by the time required for the transmission of sound between receivers 57 and 77. It will, furthermore, be seen that a voltage is impressed upon the two plate circuits which bears a definite phase relation to the voltage applied by oscillator 59. It will further be noted that the voltage on plate 85 is always displaced 180° from that on plate 86. The result is that if the voltage on primary 90 of transformer 91 is exactly 90° displaced from the voltage on primary 102 of transformer 103, each of the relay windings 109 and 113 will receive an equal amount of current. This will be due to the fact that under these circumstances the grid voltage supplied by transformer 91 will be positive during a quarter cycle in which plate 85 is positive with respect to cathode 98 and also will be positive during a quarter cycle in which plate 86 is positive with respect to cathode 98. Upon any change in the relative phase of the voltage applied to transformers 91 and 103, however, the amount of current supplied to relay windings 109 and 113 will differ due to the fact that the grids are positive during unequal portions of the halves of the cycle that their respective plates are positive. Accordingly, the arrangement just described provides a very sensitive method of detecting a change of phase between current supplied by the oscillator and the current supplied by amplifier 78 in accordance with the phase of the sound impulses reaching receiver 77.

If it is assumed that the temperature in the bath 51 decreases, then the time required for the transmission of sound between receivers 57 and 77 will be correspondingly increased. As a result, the phase of the voltage applied to the primary 90 of transformer 91 will be retarded and will be more or less than 90° displaced from the voltage applied to primary 102 depending upon whether the apparatus is initially set so that the voltage applied to primary 90 lags or leads by 90° the voltage applied to primary 102. The apparatus is so adjusted initially that the result of this change in phase of the voltage applied to primary 90 is that winding 113 is less highly energized than winding 109 causing contact arm 116 to be deflected to the left into engagement with contact 118. When this occurs, the following circuit is established to motor winding 68: from line wire 62, through conductor 121, contact arm 116, contact 118, conductor 123, motor winding 68, and conductor 122 to the other line wire 61. The energization of winding 68 is effective to cause the motor to rotate in a direction such that valve 54 is moved to open position. At the same time, variable condenser 63 is so adjusted that the frequency of the voltage applied by oscillator 59 is increased. The effect of the increase in the frequency supplied by oscillator 59 and consequently of the frequency of the sound impulse is to eliminate the phase difference between the voltage applied to transformers 90 and 103. The rotation of shaft 70 continues until a change in frequency effected by the adjustment of variable condenser 63 has caused the voltage applied to transformers 91 and 103 to again be exactly 90° out of phase. Under these conditions, relay windings 109 and 113 are again equally energized causing the relay to again resume a balanced position wherein contact arm 116 is spaced from both contacts 118 and 119.

The increase in the opening of valve 54 causes more gas to be supplied to burner 52 with the result that the temperature of the fluid 51 will begin to rise. As the temperature rises, the speed of transmission of sound between receivers 57 and 77 increases causing the phase of the voltage applied to transformer 91 to be advanced. The result will be opposite to that occurring in the previously described case so that relay winding 113 will become more highly energized than relay winding 109 causing contact arm 116 to move into engagement with contact 119. Under these circumstances, the field winding 67 of motor 64 will be energized through the following circuit: from line wire 62, through conductor 121, contact arm 116, contact 119, conductor 124, field winding 67 and conductor 122 to the other line wire 61. The energization of field winding 67 will cause the motor to rotate in the opposite direction to that caused by energization of field winding 68. The result of this will be that valve 54 is moved towards closed position. The variable condenser 63 will be adjusted so as to decrease the frequency supplied by oscillator 59. This rotation of shaft 70 by motor 64 will continue until the frequency supplied by oscillator 59 is such as to cause the phase of the voltage applied to transformer 91 to again be exactly 90° out of phase with that applied to transformer 103. When this occurs, windings 109 and 113 will again be energized so that contact arm 116 is again in its neutral position. Under these conditions, the valve 54 will admit less gas to burner 52.

It will be readily seen that by the provision of the apparatus just described, it is possible to control extremely accurately the average temperature of any medium. Moreover, due to the fact that through the use of the oscillator and a thermionic relay, it is possible to employ extremely high frequencies, the pipe 56 may be as short as desired. Referring to the previous figures, it will be noted that with a current supply having a frequency of 60 cycles, it was necessary to employ at least 500 feet of pipe. By employing a frequency of 6,000 cycles, for example, it is possible to employ a pipe only 5 feet long. There are very few installations where such a pipe would be excessively long and if such existed, the apparatus is susceptible of use with even higher frequencies. It will be noted that in this species, a different method is employed for readjusting the balancing of the system than is employed in connection with Figure 1. In the species of Figure 1, the phase of the current whose phase was affected by the speed of the transmission of sound was adjusted by means of a phase displacing apparatus. In the species of Figure 2, the rebalancing of the system was effected through an adjustment of the frequency of the current supplied to the system. It is to be understood, of course, that other rebalancing methods could be employed. For example, it would be entirely possible to employ auxiliary windings in connection with relay windings 109 and 113 and to adjust the current in these auxiliary windings to rebalance the relay.

In the two previously described species, an alternating current was employed to produce a sound, which sound was as a result a continuous wave train. In these species, the time required for the transmission of the sound along a path extending through a medium whose temperature was to be controlled was measured by reconverting the same to electrical energy and comparing the phase of the same with the phase of the original source. In other words, the energy was transmited over two paths. The energy was transmited over one path in the form of electrical energy and over the other path in the form of sound. It is, of course, entirely possible to transmit sound over two paths which are differently affected by changes in temperature and to compare the times of arrival of the sound over these two paths. In such a case, it is possible to employ a sound impulse having a relatively sharp wave front. Such an arrangement is disclosed in the species shown in Figure 3.

The controlling apparatus of Figure 3 is shown for purposes of illustration as applied to the control of the temperature of a room. It is to be understood, however, that this is merely for purposes of illustration and that the controlling system is of general application. The heating unit is designated by the reference numeral 150 and consists of a steam boiler. The boiler 150 has associated therewith an oil burner 151 having the usual blower motor 152, only the terminal plate of which is shown. Extending from the boiler is a steam pipe 153 which leads to radiators 154 (only one of which is shown) which are located at various points in the building. Only one room, 155, of the building is shown.

Extending through room 155 are two tubes 156 and 157, which tubes are preferably of relatively thin material of good heat conductivity, such as copper. The tubes 156 and 157 are filled with different fluids, which fluids behave differently as to the variation in their speed of transmission of sound with temperature change. Any two fluids may be employed whose variation in speed of transmission of sound per unit change in temperature is different. As a sample of two fluids which may be employed, it is possible to employ very satisfactorily ethyl ether and ethyl alcohol. The percentage of change in the velocity of sound through ethyl ether per degree C. temperature change is 0.0625, while the percentage change in the velocity of sound through ethyl alcohol per degree C. temperature change is 0.205. The result is that there is a differential change in velocity per degree C. of .142 per cent. Such a differential change is sufficient to produce a relatively large change in the relative time of transmission of sound through the two pipes upon a very small temperature change, as will be more apparent from the subsequent description.

In view of the fact that the two fluids are apt to have different speeds of transmission of sound at the optimum temperature, it is necessary for one tube to be of longer length than the other. In the present instance, the tube 157 is made longer in length.

In order to make the length adjustable so as to vary the temperature maintained by the system, the tube 157 is broken at an intermediate point in the room, the two ends being extended outwardly and a U-shaped tube 158 mounted in tight sliding engagement with the same. Affixed to the U-shaped tube 158 is a pointer member 159 which cooperates with a fixed scale 160. The fixed scale 160 is calibrated in terms of degrees and is adapted to indicate the temperature which will be maintained by the system for any particular setting of U-shaped tube 158.

A telephone receiver or other suitable device for converting electrical energy into sound energy is indicated by the reference numeral 165. The receiver 165 is connected through conductor 166 and through conductor 167, contact 168, switch blade 169, and conductor 170 to the opposite terminals of a condenser 171. Also connected across the terminals of condenser 171 are battery 172 and resistance 173. It will be readily seen that upon switch blade 169 being moved into engagement with contact 168, the condenser 171 will be permitted to suddenly discharge causing a sound impulse of relative sharp wave front to be introduced into the two tubes simultaneously.

A motor 175 is employed for actuating the switch blade 169. This motor comprises a rotor 176 and a field winding 177. The field winding 176 is connected to line wires 178 and 179 leading to a suitable source of power (not shown). A manual switch 180 is interposed in the connections of field winding 177 to the line wires for the purpose of stopping the operation of motor 177 when it is desired to place the apparatus out of operation. The motor 175 operates through a reduction gear train 181 to drive a shaft 182 to which are secured two cams 183 and 184. Cam 183 is provided with a projection 186 which is adapted to engage switch 169 once during each rotation thereof. Every time the projection 186 engages switch arm 169, a switch arm is moved into engagement with contact 168 and discharges the condenser 171 into the receiver 165. The cam 184 is provided with a toe portion 189 which is of slightly greater length than the projection 186 of cam 183. The cam 184 is adapted to cooperate with a switch blade 190 which, in turn, cooperates with a contact 191, the switch arm 190 being moved into engagement with contact 191 upon the toe portion 189 engaging the arm. The projection 186 of cam 183 and the toe portion 189 of cam 184 are so located with respect to each other and with respect to their respective switches that switch blade 190 is moved into engagement with its contact 191 simultaneously or slightly before the switch blade 169 is moved into engagement with its contact. Moreover, due to the elongated character of heel portion 189, switch blade 190 remains in engagement with contact 191 for a short period after switch blade 169 has moved away from its contact. The function of switch blade 190 will be described later.

Telephone receivers 194 and 195 are located at the opposite ends of the tubes 157 and 156 and each generate an electrical current through a circuit connected thereto upon the arrival of the sound impulse through the tube with which it is associated. In general, it may be stated that these two receivers are connected into the grid circuits of two gas filled tubes in the output circuits of which are located the two relay windings of a balanced relay. The two gas filled tubes are connected in parallel and are energized from a direct current source so that the moment that the grid potential of either tube is raised sufficiently to permit plate current to flow, such flow of current continues and reduces the potential across the other tube so as to prevent the flow of current therethrough. Either one tube or the other is energized, depending upon which sound impulse arrives first and accordingly which grid potential is suddenly raised.

Referring to the specific apparatus which has just been generally described, the gas filled thermionic tubes are indicated by the reference characters 196 and 197. These tubes are shown as triodes having filament cathodes although it is to be understood that any other type of grid controlled gas filled tube may be employed. The tube 196 comprises a plate 198, a grid 199, and a filament cathode 200. Similarly, gas filled tube 197 comprises a plate 202, a grid 203, and a filament cathode 204. The two cathodes 200 and 204 are connected in series with a battery 205 which serves to supply heating current to the cathodes. Connected between the mid point of the two cathodes 200 and 204 and the grid 199 is a resistance 206, and a battery 207 in series. The battery 207 serves to bias the grid negatively with respect to the cathode. Similarly, a connection including a resistance 208 and a battery 209 is made between the mid point of cathodes 200 and 204 and the grid 203, the battery 209 similarly serving to bias grid 203 negatively with respect to its cathode. The receiver 194 is connected to the opposite terminals of resistance 208 through conductors 211 and 212. Similarly, the receiver 195 is connected through conductors 216 and 217 to the opposite terminals of resistance 206. The receivers function as transmitters to generate a current flow upon the arrival of the sound impulse. The current flow generated by the receiver flowing through the resistance connected across the receiver and the grid circuit, builds up a potential across the resistance sufficient that the grid with which the receiver is associated is raised sufficiently in potential to render the gas filled tube conductive.

One terminal of switch 190 is connected through conductor 220 to a point intermediate cathodes 200 and 204. Plates 198 and 202 are connected to relay windings 221 and 222 which constitute the two relay windings of a snap action relay which will be presently described. The opposite terminals of relay windings 221 and 222 are connected together through conductor 223, which is connected to the positive terminal of battery 225 in series with a resistance 224. The negative terminal of battery 225 is connected to contact 191. It will be readily seen that relay winding 221 is in the plate circuit of tube 196 and relay winding 222 in the plate circuit of tube 197.

Associated with the two relay windings 221 and 222 is a U-shaped armature 228. The two legs of this U-shaped armature are adapted to cooperate with the positive relay windings 221 and 222. Secured to the U-shaped armature 228 is a contact arm 229 which is insulated from armature 228 at 230. The U-shaped armature 228 is pivoted at 231 and a spring 232 is fastened to contact arm 229 on one side of pivot 231 and is secured to a fixed support on the opposite side of the pivot point. It will be readily seen that spring 232 serves to impart a snap to arm 229 and to hold the same biased in either of two extreme positions. The contact arm 229 is adapted to engage on one side against the fixed stop 234 and on the other side is adapted to engage with a contact 235.

The apparatus is so calibrated initially that when the temperature is at the desired temperature, the sound impulses produced by the discharge of condenser 171 through receiver 165 will arrive at receivers 194 and 195 simultaneously. Due to the fact, however, that the fluids contained in tubes 156 and 157 have characteristics such that the variation in their speed of transmission of sound with change in temperature is different for each tube, the result is that upon the temperature being reduced, it will take longer for the sound impulse to travel through one tube than through the other and, similarly, upon the temperature being increased it will take a shorter time for the sound to travel through said tube than through the other tube. If it be assumed that the fluids are ethyl ether and ethyl alcohol, as suggested, the ethyl ether would be located in the shorter tube 156 and the ethyl alcohol in the longer tube 157, since the speed of transmission of ethyl alcohol is much higher than that of ethyl ether. If the fluids are so located, a decrease in the temperature of space 155 and a consequent decrease of the temperature in the fluids of tubes 156 and 157 will cause the sound to travel more rapidly through the shorter tube 156 due to the fact that the relative decrease in velocity is less per degree temperature change with the fluid in this tube. The result will be that the sound impulse will arrive at receiver 195 before receiver 194. Accordingly, the grid 199 or tube 196 will be raised in potential sufficiently to cause a breakdown of the tube before the potential of grid 203 is raised. The result will be that there will be a flow of plate current through the following circuit: from the positive terminal of battery 225, through resistance 224, conductor 223, relay winding 221, plate 198, cathode 200, conductors 239, 236 and 220, switch blade 190, and contact 191 to the negative terminal of battery 225.

It will be noted that the circuit just traced is dependent upon switch blade 190 being in engagement with contact 191. As previously explained, the blade 190 is held in engagement with contact 191 for a short period of time after switch blade 169 is first moved into engagement with contact 168 discharging condenser 171 through receiver 165. The result will be that this switch is still held closed upon the sound impulse arriving at receiver 195 and raising the grid potential in a manner previously described.

The result of the flow of current through the previously described plate circuit will be that relay winding 221 will be energized causing the armature 228 to rotate and move contact arm 229 into engagement with contact 235. Upon this taking place, the following circuit will be established to oil burner motor 152: from line wire 179 through conductor 240, contact arm 229, contact 235, conductor 241, blower motor 152, and conductor 242 to the other line wire 178. The oil burner will now be placed in operation so as to tend to increase the temperature of the room.

A short time after the winding 221 is energized in the manner previously described, the plate circuit will be interrupted by reason of switch arm 190 moving out of engagement with contact 191. This will not affect the relay, however, inasmuch as the spring 232 serves to hold contact arm 229 in engagement with contact 235 on deenergization of the relay. The plate current will thus be interrupted but the burner will still continue to operate. In this manner, an excessive drain on the battery 225 is avoided. The burner will continue in operation until the motor 175 has rotated the cams until switch arms 169 and 190 are again moved into engagement with their respective contacts. The reduction gear 180 can be so designed with respect to the speed of the motor as to give any desired speed of rotation of shaft 182. The speed of rotation of shaft 182 should be so selected as not to be so fast as to give an unnecessary number of operations of the controlling apparatus and at the same time not so slow as to permit the temperature to deviate very far from the desired value.

If upon switch blades 190 and 169 again being moved into engagement with contacts 168 and 191, the temperature in room 155 is still below the desired value, the operation of the oil burner 151 will not be affected. The only thing that will happen will be that relay winding 221 will again be energized for a short period of time. As soon as the temperature rises even the slightest amount above the desired temperature, however, the sound impulse will arrive at receiver 194 before it arrives at receiver 195. This will result in the potential of grid 203 of tube 197 being raised before the potential of grid 199 is raised. The result will be that tube 197 will discharge before tube 196. The flow of current will take place through the following plate circuit: from the positive terminal of battery 225 through resistance 224, relay winding 222, plate 202, cathode 204, conductors 238, 236, and 220, switch blade 190, and contact 191 to the negative terminal of battery 225. It will be noted that the circuit just traced contains the relay winding 222 so that upon the establishment of this circuit, this relay winding will be energized. The energization of this relay winding 222 will rotate the armature 238 in a clockwise direction causing contact arm 229 to be moved out of engagement with contact 235 into engagement with the fixed stop 234. The spring 232 will serve to bias the contact arm 229 to this new position and will serve to hold the same in such position upon switch blade 190 separating from contact 191 and interrupting the plate circuit of tube 197. The oil burner will now be out of operation.

The apparatus just described is extremely sensitive to a slight change in temperature. If, for example, the two suggested fluids, ethyl ether and ethyl alcohol are employed in the two tubes, there is a differential change of 0.142% in the velocity per degree C. If tubes of approximately 6 feet in length were employed so that the times of transmission at a normal temperature would be about 0.01 second, a change in temperature of one degree centigrade would give a difference of 0.0014 second in transmission. While this difference in transmission seems extremely small, it must be borne in mind that the gas filled tubes are extremely sensitive and will respond in less than a millionth of a second. As a result, it would be possible for the tubes only 6 feet in length to cause the apparatus to respond with only a one-hundredth degree centigrade change in temperature. Of course, where the pipes are longer, as would normally be the case, the response would be even more accurate.

While ethyl ether and ethyl alcohol have been suggested as two fluids which would be suitable for use in the two tubes, it is to be understood that these are merely examples for purposes of illustration and that any other two fluids having suitable differences in their change in speed of transmission of sound with change of temperature could be employed. If the apparatus is to be used for measuring extremely high temperatures, stable gases, such as nitrogen and argon would be more suitable.

It will be readily seen that in the species just described that the temperature can be controlled extremely accurately, the apparatus responding to temperature changes of as small as a one-hundredth degree. Moreover, the temperature control is not merely the temperature at one or more points in the room being controlled but is the average temperature taken along an infinite number of points taken along the two walls and the ceiling of the room. It is obvious that the pipes could be extended through any portion of the room desired where their appearance would not be too unharmonious and, moreover, if desired, could be extended through the entire building so as to control the operation of the burner in accordance with the average temperature prevailing throughout the building. Furthermore, the apparatus may be so designed, in spite of its extreme accuracy of control, to prevent too frequent operations of the burner by suitably designing the gear train of the motor driving the cams which control the frequency of the sound impulses.

In general, it will be readily seen that in all three species of my invention, I have provided a relatively simple means for determining the average temperature prevailing throughout a medium whose temperature is under consideration. It will, furthermore, be seen that the apparatus provided is extremely accurate and will enable the temperature to be controlled in an extremely accurate manner.

While I have shown the apparatus in certain specific forms and as applied to certain specific uses, it is to be understood that this is for purposes of illustration only and that the invention is to be limited only by the scope of the appended claims.

I claim as my invention:

1. In a temperature control system, temperature varying means, means for producing a sound impulse, and means operative to control said temperature varying means in accordance with the time required for said sound impulse to travel a predetermined distance over a path affected by the temperature of a controlling medium.

2. In a system for controlling the temperature of a medium, temperature varying means, means for producing a sound impulse, and means operative to control said temperature varying means in accordance with the time required for said sound impulse to travel a predetermined distance over a path affected by the temperature of said medium.

3. In a system for controlling the temperature of a space, temperature varying means, a source of energy, means for transmitting said energy over two paths at least one of which is exposed to the temperature of the space, said paths being of such nature and the energy being transmitted over said paths in such form that the relative speed of transmission thereof varies with changes in the temperature of said space, and means responsive to the difference in the speed of transmission of said energy operative to control said temperature varying means.

4. In a system for controlling temperature, temperature varying means, a source of electrical energy, means for converting said electrical energy to sound and transmitting the same over a path extending through a controlling medium, means for reconverting said sound to electrical energy, and means responsive to the time required for the transmission of said energy over said path operative to control said temperature varying means.

5. In a system for controlling temperature, temperature varying means, a source of alternating electrical energy, means for converting a portion of said electrical energy to sound and transmitting the same over a path extending through a controlling medium, means for reconverting said sound to alternating electrical energy, and means responsive to the change in phase of said electrical energy operative to control said temperature varying means.

6. In a system for controlling temperature, temperature varying means, a source of alternating electrical energy, means for converting a portion of said electrical energy to sound and transmitting the same over a path extending through a controlling medium, means for reconverting said sound to alternating energy, and means responsive to the change in phase of said electrical energy operative to adjust said temperature varying means and to simultaneously compensate for said change in phase.

7. In a system for controlling temperature, temperature varying means, a source of alternating electrical energy, means for converting a portion of said electrical energy to sound and transmitting the same over a path extending through a controlling medium, means for reconverting said sound to alternating energy, and means for regulating said temperature varying means, said regulating means comprising a two phase motor, one phase of said motor being energized by electrical energy having a definite phase relation with respect to said source and the other phase of said motor being energized by electrical energy having a definite phase relation to the transmitted electrical energy.

8. In a system for controlling temperature, temperature varying means, a source of alternating electrical energy, means for converting a portion of said electrical energy to sound and transmitting the same over a path extending through a controlling medium, means for reconverting said sound to alternating electrical energy, and means responsive to the change in phase of said electrical energy operative to adjust said temperature varying means and to simultaneously change the frequency of said source of electrical energy until said phase difference is eliminated.

9. In a temperature control system, temperature varying means, means to produce a sound impulse, means providing a pair of paths for said sound impulse subjected to the temperature of a controlling medium, the paths being such that the variation in the speed of transmission of sound with change in temperature is different for each path, and means responsive to the difference in the time of travel of said sound impulse over said two paths to control the operation of said temperature varying means.

10. In a temperature control system, temperature varying means, means to produce a sound impulse, means providing a pair of paths for said sound impulse subjected to the temperature of a controlling medium, the paths being such that the variation in the speed of transmission of sound with change in temperature is different for each path, and means operative to cause said temperature varying means to either decrease or increase its temperature varying effect depending upon which path said sound impulse travels over more rapidly.

11. In a temperature control system, temperature varying means, means to produce a sound impulse, means providing a pair of paths for said sound impulse subjected to the temperature of a controlling medium, the paths being such that the variation in the speed of transmission of sound with change in temperature is different for each path, and means to adjust the length of one of said paths so as to vary the temperature maintained by said system.

12. In temperature responsive apparatus, means for producing a sound impulse, means for conveying said sound over a path through a medium having a variable temperature, and translating means positioned in accordance with the time required for said sound to travel over said path.

13. In temperature responsive apparatus, a source of alternating electrical energy, means for converting a portion of said electrical energy to sound and transmitting the same over a path extending through a controlling medium, means for reconverting said sound to alternating electrical energy, and translating means positioned in accordance with the change in phase of said electrical energy.

14. In temperature controlling apparatus, temperature changing means, means for transmitting energy over a pair of temperature responsive paths through a controlling medium, said paths being of such character that the effect of a change in temperature upon the speed of transmission of each path is different, and means responsive to the difference in time required for transmission of said energy over said paths to control said temperature changing means.

15. In apparatus responsive to a condition affecting the speed of transmission of sound, a source of alternating current, means for converting said alternating current to sound and transmitting the same over a path through a medium, the condition of which is to be considered, means for reconverting said sound to a periodically varying current, a grid controlled space discharge device, means for impressing upon the grid circuit of said device a periodically varying voltage bearing a definite phase relation to the reconverted current, means for impressing upon the output circuit of said device a periodically varying voltage bearing a definite phase relation to the source of current, and translating means in said output circuit.

16. In a system for controlling the temperature of a fluid in an underground pipe line, means for heating said fluid, means for producing a sound impulse at one point in said pipe line, and means controlling said heating means in accordance with the time required for said sound impulse to travel a predetermined distance over said pipe line.

17. In a temperature control system, temperature changing means, a pair of grid controlled gas filled space discharge tubes, means connecting said tubes in parallel to a source of voltage, means for impressing upon the grid of each of said tubes a voltage sufficient to cause said tube to discharge, temperature responsive means for varying the relative time at which said grid voltages are respectively applied, and means responsive to which of said tubes is caused to discharge controlling the operation of said temperature changing means.

HENRY E. HARTIG.